A. KADOW.
GLASS MOLDING MECHANISM.
APPLICATION FILED APR. 20, 1911.
1,156,009.
Patented Oct. 5, 1915.
3 SHEETS—SHEET 3.
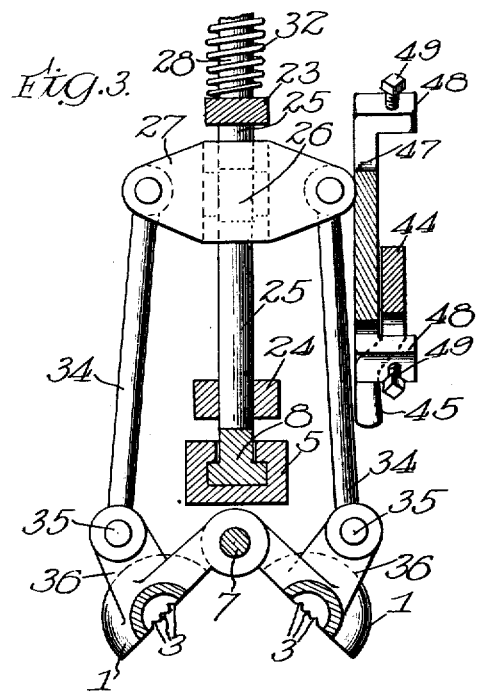
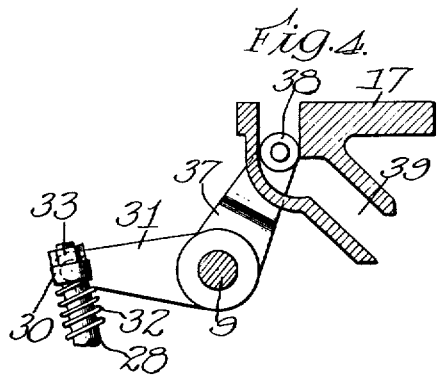
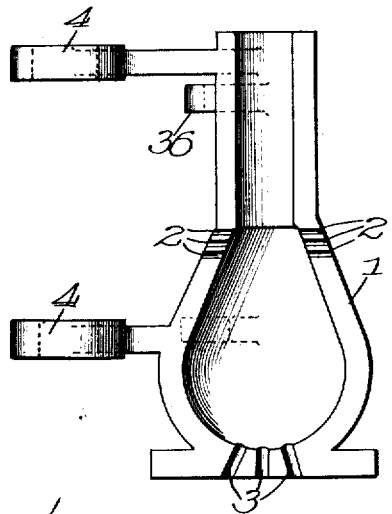
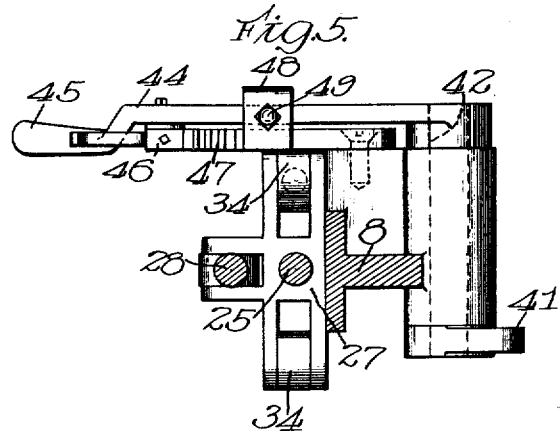
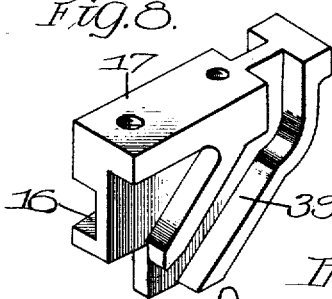
Witnesses:
Inventor:
August Kadow

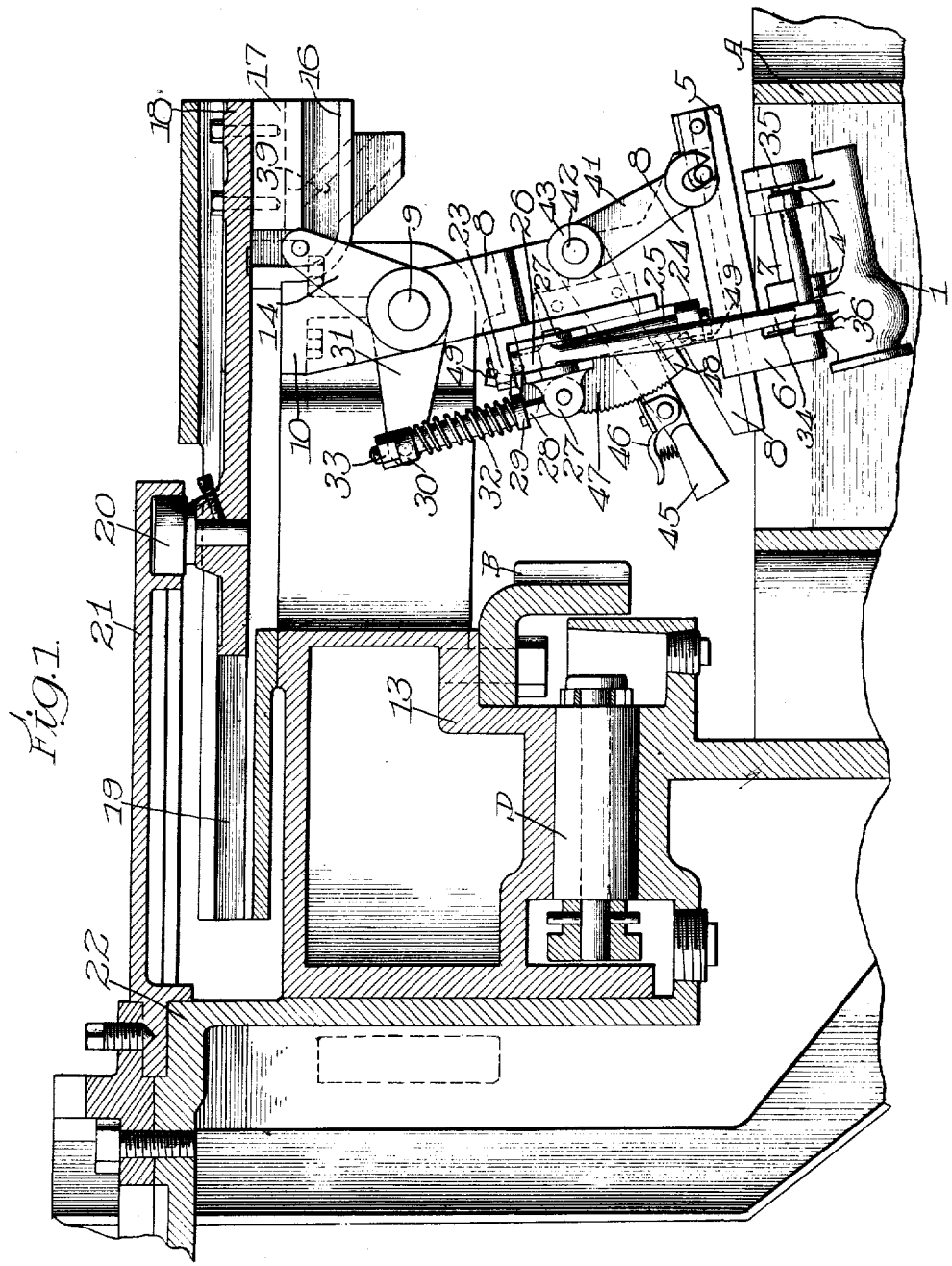

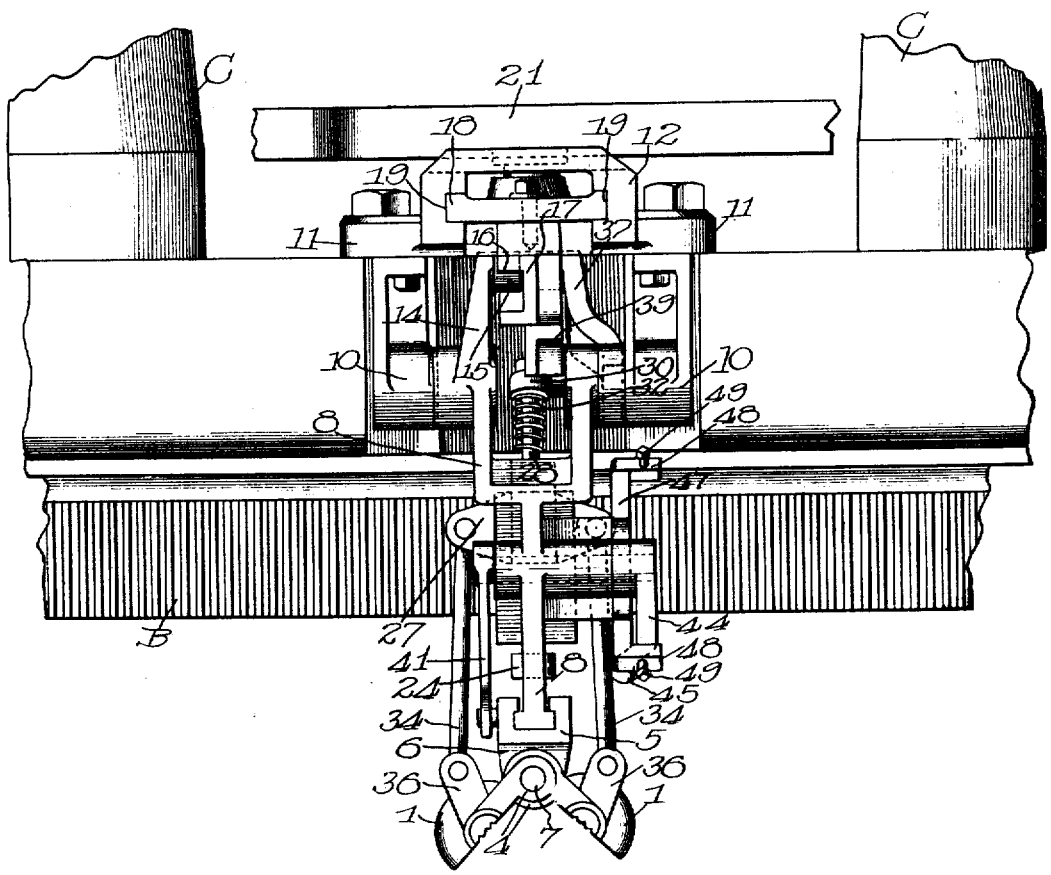

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-MOLDING MECHANISM.

1,156,009.  Specification of Letters Patent.  Patented Oct. 5, 1915.

Original application filed July 6, 1910, Serial No. 570,621. Divided and this application filed April 20, 1911. Serial No. 622,244.

*To all whom it may concern:*

Be it known that I, AUGUST KADOW, a citizen of the United States, residing at Toledo, in the county of Lucas and State of Ohio, have invented certain new and useful Improvements in Glass-Molding Mechanism, of which the following is a specification.

This application is a division of my copending application Serial No. 570,621, filed July 6, 1910.

My present invention relates more particularly to improvements in mold operating mechanism for glass working and is especially valuable for use in connection with paste molds and automatic glass working mechanism, although its utility is not limited to that field.

The object of my invention is to provide automatic mechanism for efficiently and reliably opening and closing a set of glass molds, especially for blown glassware, but more especially it is the object of my invention to provide such mechanism whereby the molds may be closed, opened, dipped, raised again to receive a blank, closed thereon, et cetera, at certain timed intervals, to facilitate the manufacture of blown glassware, and these operations may be utilized to the best advantage in connection with a continuously operating glass working mechanism such as is shown and described in my said co-pending application Serial No. 570,621 and for convenient illustration I have in the drawings shown my present invention as applied to certain of the mechanisms shown in said co-pending application.

These and such other objects as may hereafter appear are attained by my invention, a convenient embodiment of which is shown in the accompanying drawings, in which—

Figure 1 is a fragmentary, sectional view of a machine fitted with my improved device in which the mold carrying mechanism is shown in side elevation. Fig. 2 is a front elevation of Fig. 1. Fig. 3 is a detailed view of the mold carrier. Fig. 4 shows one of the cam-ways and engaging parts. Fig. 5 is a cross-sectional view of the mold carrier. Fig. 6 is an elevation of one mold section. Figs. 7 and 8 are perspective views of opposite sides of the cam block.

Like characters of reference indicate the same parts in the several figures of the drawings.

In the particular machine shown in the drawings I have illustrated the use of my invention in connection with a paste mold consisting of two half molds 1 provided with vents 2 and 3 and shown in the illustration as adapted for the making of electric light bulbs. Each mold section is provided with perforated lugs or hinges 4. The bracket 5 is provided with a shoulder 6 in which at right angles is secured a pin 7. The hinges or perforated lugs on the mold sections are hingingly mounted upon the pin 7.

The bracket 5 is mounted upon the mold carrier 8 in such manner as to be slidably adjustable thereon longitudinally of the bracket 5. The mold carrier 8 is in turn mounted on bearing studs 9 secured to hangers 10 which are bolted to the flanges 11 of the box 12, which in turn is bolted to a movable and preferably a rotating framework 13, such as the lower spider mentioned in my co-pending application.

Formed on the mold carrier 8 is an arm 14 provided with a roller 15 arranged to run in a cam groove 16 formed in a cam block 17 which is secured to a slide plate 18. The slide plate 18 reciprocates radially of the machine in slideways 19 formed in the box 12 and is provided with a roller 20 engaging a groove or cam way in the cam plate 21. This cam plate 21 is rigidly secured to a stationary part of the structure 22, such as the central drum of the machine shown in my copending application 570,621. The frame-work such as the spider 13 which carries the mold operating mechanism as above specified moves with relation to the stationary part 22 and preferably rotates about the stationary part as in the machine of my said copending application. Consequently the coöperation of the roller 20 and cam plate 21 results in reciprocating the slide plate 18, and the coöperation between the roller 15 on the arm 14, and the groove 16 in the block 17 are such that as the slide plate 18 is drawn inwardly toward the stationary part of the machine the arm 14 is rocked and in turn rocks the mold carrier 8 so as to bring the mold carrier and the parts carried thereby into horizontal position.

Secured between lugs 23 and 24 on the mold carrier 8 is a rod 25 upon which is slidably mounted a cross-head 26. Pivoted to a lug 27 on this cross-head is a rod 28, provided at one end with a collar 29 and extending at the other end through a lug 30 on the arm 31. A spring 32 surrounds the rod 28 and is seated at opposite ends against the collar 29 and lug 30 respectively. A nut 33 on one end of the rod 28 engages the lug 30 on the arm 31.

The cross-head 26 has two rods or links 34 pivoted to it one on each side which rods are in turn pivotally connected with hinge pins 35 secured in lugs 36 on the mold sections 1, respectively. The hinge pins 35 and the links 34 are also slidable with relation to each other, lengthwise of the hinge pins 35.

The arm 31 is one arm of a bell crank which rotates upon one of the studs 9, the opposite arm 37 of this bell crank is provided with a roller 38 running in a way or groove 39 in the cam block 17, on the side thereof opposite to the cam groove 16. Consequently the reciprocation of the slide plate 18 in addition to operating the arm 14 to swing the carrier 8 on its horizontal axis 9 also moves the bell crank arms 31 and 37 to compress the spring 32 against the collar 29 so as to force the rod 28 and the cross-head 27 forwardly, operating thereby, through the links 34 to close the mold sections 1.

The purpose of interposing the spring 32 is mainly a matter of safety, in case a piece of hardened glass or other non-yielding obstruction should interfere with the closing of the mold sections.

Upon the reverse movement of the parts when the coaction between the cam plate 21 the roller 20 operates to move the slide plate 18 outwardly from the stationary part 22, the rocking of the lever arm 31 carries the lug 30 against the nut 33 and positively draws the rod 28 and the cross-head 27 backwardly, thereby opening the mold sections.

The contour of and relations between the cam grooves 16 and 39 in the cam block 17 are such that the vertical parts of these cam ways and the horizontal parts thereof immediately adjoining the vertical parts are parallel with each other, but while the cam way 16 then continues to be horizontal to the end of the cam block 17, the cam way 39 diverges and extends downwardly forward almost but not quite from the point where it changes from the vertical. The result of this arrangement is that when the rearward movement of the slide plate 18 initially rocks the arm 14 so as to bring the mold 8 to a horizontal position, bringing the molds 1 to their vertical or blank receiving position, the molds will be and remain open for a short part of the rearward travel of the slide plate 18, but as the slide plate 18 continues its rearward travel without further actuating the arm 14, the arm 37 of the bell crank will be forced downwardly by the engagement of its roller 38 with the cam-way 39 thereby rocking the bell crank, forcing the cross-head 27 to move forwardly and closing the molds 1. By virtue of this arrangement the molds are brought to a vertical position while open are closed upon the blank at the proper moment, and while in vertical position, and upon the reverse movement the parts open horizontally to release the blank and are then dipped downwardly into the water tank A (Fig. 1).

For the purpose of adjusting the vertical position of the mold the bracket 5 is longitudinally slidable upon the mold carrier 8, as heretofore noted, and is provided with a pin 40 engaging the slotted end of one arm 41 of a bell crank lever, the shaft 42 of which turns in a bearing 43 on the mold carrier 8 and the opposite arm 44 of which is provided with a handle 45 and a spring locked dog 46 which engages the teeth of a segmental rack 47, the lugs 48 and set screws 49 serve as stops to limit the movement of the arm 44. It will be observed that this mold operating mechanism operates not only to raise and close the mold at related time intervals to receive the service of the blank or bulb, but also to dip and raise the mold so that at the proper timed intervals the mold may be automatically dipped into the water tank, the mechanism being so timed that the mold is open as it passes through the water tank. Also although any suitable actuating mechanism may be used I have for convenience illustrated my invention as the same is illustrated and applied in my said copending application No. 570,621. Thus the part 22 may be typical of any relatively stationary part supporting the cam plate or like device 21. The mold carrying mechanism as shown is mounted upon a movable part 13 which moves past or preferably around the relatively stationary part 22 and may be actuated in any suitable manner as for example, by means of the gearing B meshing with any suitably driven gear mechanism. C indicates supports carried on the part 13 as a part of the frame-work which carries other co-acting parts of the mechanism. The part 13 may be mounted in any suitable manner or preferably it is caused to travel on antifriction bearings, such as the bearings D which are shown as a familiar form of roller bearing provided with suitable oil receptacles to insure its operation in a bath of oil. It should be understood, however, I do not limit myself to these various details of construction which are intended merely to show a convenient and as I now believe a preferred embodiment of my invention but many changes in such details may be made as matter of shop expedience or for other reasons without departing from the spirit of my invention, it being my purpose to here claim broadly as well as in detail everything here shown which is patentably novel at this time.

I claim,—

1. The combination with a mold carrier, of a bracket carried thereby, mold sections hinged to said bracket and extending longitudinally thereof, means for opening and closing said mold sections, and means for moving said bracket in the direction of its length with relation to said carrier and for locking it in any adjusted position, said mold sections being movable with said bracket with relation to said opening and closing means.

2. The combination with a mold carrier, of a bracket carried thereby and adjustable thereon lengthwise of said bracket, mold sections hinged to said bracket, mold operating means mounted on said carrier, means mounted on said carrier for adjusting said bracket longitudinally thereof with relation to said carrier and for locking the same in any adjusted position.

3. The combination with a mold carrier, of mold sections, actuating means therefor, and a bracket carrying said mold sections and slidably mounted on said mold carrier, of means for adjusting the position of said bracket on said carrier, said means comprising a lever pivoted to said carrier and engaging said bracket, and means for locking the bracket in any adjusted position, said mold sections and mold actuating means being provided with relatively slidable elements to permit of such adjustment of the bracket.

4. The combination with a mold carrier, of mold sections carried thereby, a crosshead slidably mounted on said mold carrier, links connecting said cross-head with said mold sections respectively, a rod pivoted to said cross-head and provided with a shoulder, a spring surrounding said rod and seated at one end against said shoulder, a lever mounted on said carrier, a lug on said lever slidably engaging said rod and providing a seat for the opposite end of said spring, and an abutment on said rod arranged to engage said lug, all so arranged that when rocked in the one direction the lever will compress the spring and actuate the mold sections, and when rocked in the opposite direction it will operatively engage said abutment and thereby reversely actuate said mold sections.

5. The combination with a traveling support of a mold carrier, mold sections carried thereby, a slide plate, mold actuating connections between the slide plate and mold sections, and means actuated by the travel of said support for reciprocating the slide plate and thereby raising the mold sections to a position to receive the material to be molded, thereafter closing the mold sections while in that position, then opening said sections and finally lowering them to their original position.

6. The combination with a mold carrier and mold sections carried thereby, of a slide plate, and means actuated by the reciprocation of said slide plate to raise said molds to a position to relieve the material to be molded, thereafter, while in said position, to close said molds and then successively to open said molds and lower them to their original position; said means comprising a cam block carried by said slide plate and provided with a plurality of cam-ways of different contours, lever arms in operative engagement with said cam-ways respectively and arranged to be simultaneously operated thereby, and operative connections between one of said levers and said mold carrier and between the other of said levers and said mold sections.

7. The combination with a mold carrier, of mold sections carried thereby, a lever arm, operative connections between said lever arm and said mold sections whereby the operation of said arm will alternately open and close said mold sections, a second lever arm, operative connections between said second lever arm and said mold carrier, whereby the operation of said lever arm will alternately raise and lower said mold carrier, and means for operating said arms in proper timed relation to each other, said means comprising a cam-block and means for reciprocating the same, said cam-block being provided with cam-ways of different contours, in operative engagement with said lever arms respectively.

8. The combination with a traveling support, of a mold carrier, mold sections carried thereby, means actuated by the travel of said support for raising the mold sections to a position to receive the material to be molded and while in said position to thereafter open and close said molds, said means comprising a reciprocating element, a cam-block carried by said element and provided on its opposite faces with cam-ways, each formed with vertical and horizontal portions, one of said cam-ways being formed with a portion which diverges downwardly and forwardly from its horizontal portion, arms, each provided at one end with means operatively engaging said cam-ways, and means connected with the other ends of said arms respectively whereby the actuation of one of said arms will raise and lower the carrier, and the actuation of the other of said arms will open and close said mold sections.

AUGUST KADOW.

Witnesses:
W. R. Donovan,
Chas. G. Robb.

It is hereby certified that in Letters Patent No. 1,156,009, granted October 5, 1915, upon the application of August Kadow, of Toledo, Ohio, for an improvement in "Glass-Molding Mechanism," an error appears in the printed specification requiring correction as follows: Page 3, line 86, claim 6, for the word "relieve" read *receive;* and that the said Letters Patent should be read with this correction therein that the same may conform to the record of the case in the Patent Office.

Signed and sealed this 2nd day of November, A. D., 1915.

[SEAL.]

R. F. WHITEHEAD,
*Acting Commissioner of Patents.*